UNITED STATES PATENT OFFICE.

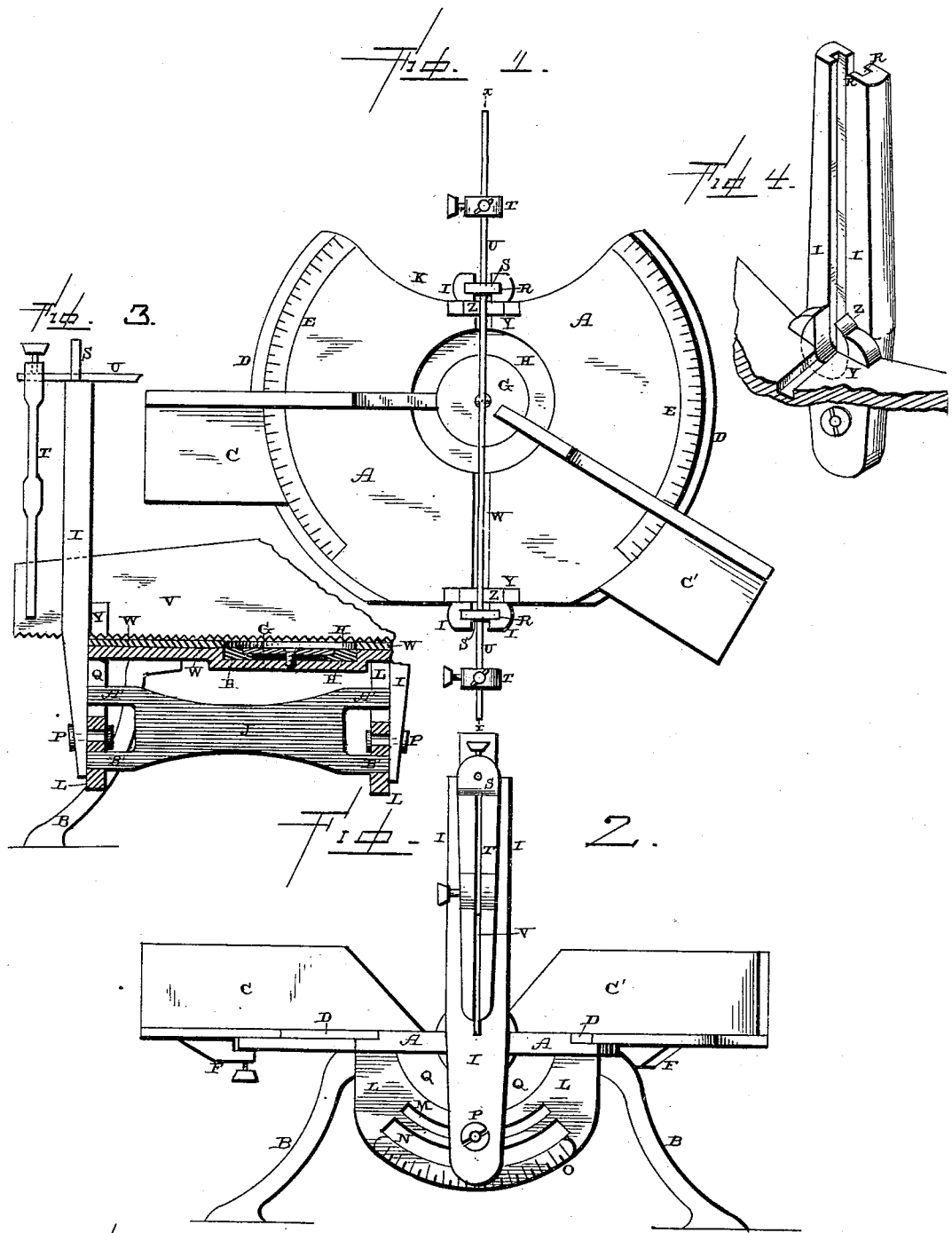

BENJAMIN F. GARDINER, OF COBLESKILL, NEW YORK.

MITER-BOX.

SPECIFICATION forming part of Letters Patent No. 377,299, dated January 31, 1888.

Application filed September 9, 1887. Serial No. 249,241. (No model.)

*To all whom it may concern:*

Be it known that I, BENJAMIN F. GARDINER, of Cobleskill, in the county of Schoharie and State of New York, have invented certain new and useful Improvements in Miter-Boxes; and I do hereby declare the following to be a full, clear, and exact description of the invention, such as will enable others skilled in the art to which it pertains to make and use it, reference being had to the accompanying drawings, which form part of this specification.

My invention relates to an improvement in miter-boxes; and it consists in, first, the combination, with the table, of the rectangular guides, the vertical portions of which extend inwardly to the center of the table, one of the guides being provided with a plate pivoted to the center of the table, and the other with a ring which moves around the plate, and a saw which is supported above the table in suitable guides; second, the combination of the table, the rectangular frames or guides, which are pivoted at or near the center of the table, the slotted standards, which are pivoted to opposite sides of the table and have their lower ends extending below the table and connected together by means of the cross-piece, the slotted plates, clamping-bolts, and the saw which is passed through the standards; third, the combination of the clamps, the slotted perforated plates, the rod which connects the upper ends of the clamps, and which passes through the holes made in the plates, the standards pivoted to opposite ends of the table, and provided with slots, in which the plates slide vertically, the saw, the table, and the guides; fourth, the combination of the table having recesses in its opposite edges, the vertical standards having lugs which fit in the recesses, the cross-pieces provided with slots or openings, the bifurcated cross-piece which connects the lower ends of the standards through the cross-pieces, and the clamping-screws, as will be more fully described hereinafter.

The object of my invention is to provide a miter-box so constructed that a piece of lumber may be cut or sawed at any angle which may be desired.

Figure 1 is a plan view of a miter-box embodying my invention. Fig. 2 is an end elevation of the same. Fig. 3 is a vertical section taken on the line *x x* of Fig. 1. Fig. 4 is a detail perspective of one of the vertical standard-journals.

The table A is supported upon legs B, and to the center of which is pivoted the lumber-guides C C'. These guides consist of rectangular frames having the vertical portion thereof extending inward to the center of the table and the horizontal portion to rest upon the cut-away portion D of the table A.

The table A is provided near its circumference with the numbers or scales E, by means of which the lumber-guides can be placed at any numerical angle to the length of the saw that may be desired. Secured to the under side of the rectangular frames or guides C C' are the clamps F, by means of which the guides are securely held in any position to which they may be adjusted. The vertical portions of the two frames have their inner ends cut away, as shown, so as to allow them to be turned around without interfering in any manner with the saw. The guide C' has its vertical portion secured to the circular plate G, which is pivoted to the center of the table, and the inner end of the vertical portion of the guide C is secured to the ring H, which moves around the plate G. By this construction the inner end of the guide C' is made to form a pivot for the inner end of the guide C.

Pivoted to opposite edges of the table A are the vertical standards I, which have their lower ends to extend a suitable distance below the table, and provided with the cross-piece J, which connects their lower ends together and securely holds the vertical standard in an upright position parallel to each other. A portion of the table A is preferably cut away, as shown at K, which allows the saw to move inward near the center of the table, and allows a greater movement of the saw than would be the case if the table were not of this construction.

If the table were circular its entire circumference, the lower portion of the handle would come in contact with it, and thus not allow the saw as great a movement as it has when a portion of the table is removed, as shown at K. Secured to opposite sides of the table and hanging vertically down are the two semicircular plates L, which are cut away at their upper edges, as shown at Q, and which are provided with the curved slots M N. One of the plates is also provided with the scale O, so as to indicate the angle at which the standards I shall extend. The lower ends of the standards I are secured rigidly together by means of the cross-piece J, which is bifurcated at its ends, the upper prongs, A', being made to pass through the curved openings Q, while the lower prongs, B', pass through the lower slot, N. The standards I are connected rigidly together by this cross-piece J, so as to cause them to move together as if made in a single piece. Passing through the lower ends of the standards I and the slots M in the plates L are the clamping-screws P, by means of which the standards are rigidly secured in any desired position. As the standards carry the saw V, it will readily be seen that the saw can be turned at any desired angle to the table, so as to cut vertically or at any angle.

The vertical standards I are provided with the vertical slots R, in which move the slotted plates S. Secured to opposite ends of the saw-blade are the two clamps T, which are connected at their upper ends by means of the rod or wire U, which rod or wire passes through holes in the upper ends of the slotted plate S. The saw V moves back and forth in the slots made in the plates S, which plates form guides to prevent the saw from having any lateral movement, but which allow the saw a free vertical movement. When the saw is removed from the box, the plates S, through which the wire or rod passes, are also removed with it.

Placed in a groove made in the table A directly under the saw will be the wooden or soft-metal strip W, which will prevent the teeth of the saw from being dulled by coming in contact with the metallic table A.

By means of a miter-box of this construction a piece of lumber can be sawed at not only an angle to its length, but at an angle to its thickness at the same time. This construction also obviates any circular movement of the table or the saw, as has been the case in devices constructed for this purpose heretofore.

The journals of the vertical standards I consist of the semicircular shaped recesses Y, made in opposite edges of the table A, and the semicircular lugs or projections Z, formed upon the standards I, and which rest in the recesses Y and are held therein by means of the lower ends of the bifurcated cross-piece J, which pass through the slots N of the depending plates L.

Having thus described my invention, I claim—

1. In a miter-box, the combination, with the table A, of the rectangular guides C C', the vertical portions of which extend inward to the center of the table, one of the guides being provided with a plate pivoted to the center of the table and the other with a ring which moves around the plate, and a saw which is supported above the table in suitable guides, substantially as shown.

2. The combination of the table, the rectangular frames or guides C C', which are pivoted at or near the center of the table, the slotted standards I, which are pivoted to opposite sides of the table, and having their lower ends extending below the table and connected together by means of the cross-piece J, the slotted plates L, clamping-bolts P, and the saw, which is passed through the standards, substantially as described.

3. The combination of the clamps T, the slotted perforated plates S, the rod U, which connects the upper ends of the clamps T, and which passes through the holes made in the plates S, the standards I, pivoted to opposite ends of the table and provided with slots R, in which the plates S slide vertically, the saw, the table A, and the guides C C', substantially as set forth.

4. The combination of the table A, having the recesses Y, the vertical standards I, having the lugs Z, cross-pieces L, provided with openings M N Q, the bifurcated cross-piece, which connects the lower ends of the standards through the cross-pieces L, and the clamping-screws P, substantially as specified.

In testimony whereof I affix my signature in presence of two witnesses.

BENJAMIN F. GARDINER.

Witnesses:
T. J. ELDREDGE,
ANDREW F. HANES.